(12) United States Patent
Pillai et al.

(10) Patent No.: US 11,996,949 B2
(45) Date of Patent: May 28, 2024

(54) PATH AND INTERFACE SELECTION BASED ON POWER AND INTERFACE OPERATING MODES IN A SOFTWARE DEFINED WIDE AREA NETWORK

(71) Applicant: Cisco Technology, Inc., San Jose, CA (US)

(72) Inventors: Harikrishnan Pillai, San Jose, CA (US); Jie Zhou, Sunnyvale, CA (US); Niels-Peder Mosegard Jensen, Sunnyvale, CA (US); Christine Lan Yu, Saratoga, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/876,091

(22) Filed: Jul. 28, 2022

(65) Prior Publication Data

US 2024/0039743 A1 Feb. 1, 2024

(51) Int. Cl.
*H04L 12/46* (2006.01)
*H04L 12/12* (2006.01)
*H04L 43/0876* (2022.01)
*H04L 43/20* (2022.01)
*G06F 9/50* (2006.01)
*G06F 16/95* (2019.01)
*G06F 16/951* (2019.01)

(52) U.S. Cl.
CPC .......... *H04L 12/12* (2013.01); *H04L 43/0876* (2013.01); *H04L 43/20* (2022.05)

(58) Field of Classification Search
CPC ...... H04L 12/12; H04L 43/20; H04L 43/0876
USPC ......................................................... 709/224
See application file for complete search history.

(56) References Cited

U.S. PATENT DOCUMENTS

| | | | |
|---|---|---|---|
| 10,685,260 B1* | 6/2020 | Adelaar | G06F 18/2148 |
| 10,932,322 B2* | 2/2021 | Bull | H04W 92/02 |
| 2013/0024552 A1* | 1/2013 | Libert | H04L 61/5007 709/220 |
| 2017/0109670 A1* | 4/2017 | Marcu | G06F 8/30 |
| 2017/0359272 A1 | 12/2017 | Srinivasan et al. | |

(Continued)

FOREIGN PATENT DOCUMENTS

| | | |
|---|---|---|
| CN | 112217655 A | 1/2021 |
| EP | 3965408 A1 | 3/2022 |

OTHER PUBLICATIONS

Yan, et al., "OSPF Extensions for MPLS Green Traffic Engineering," IETF, Network Working Group, Internet-Draft, https://www.ietf.org/archive/id/draft-li-ospf-ext-green-te-01.txt, Oct. 14, 2013, 5 pages.

(Continued)

*Primary Examiner* — Jude Jean Gilles
(74) *Attorney, Agent, or Firm* — Edell, Shapiro & Finnan, LLC (57) ABSTRACT

Presented herein are techniques to conserve power by network devices in a software define wide area network (SD-WAN). A method includes monitoring operations of a software defined wide area network including a network device in the software defined wide area network, based on results of the monitoring, generating a usage model for the network device, determining, based on the usage model, an interface selection scheme for the network device, and causing the network device to execute the interface selection scheme.

20 Claims, 5 Drawing Sheets

(56) References Cited

U.S. PATENT DOCUMENTS

| | | | |
|---|---|---|---|
| 2018/0046956 A1* | 2/2018 | Marcu | G06Q 10/067 |
| 2019/0370420 A1* | 12/2019 | Feng | G06F 30/20 |
| 2020/0372428 A1* | 11/2020 | Liu | G06Q 10/06315 |
| 2021/0288898 A1 | 9/2021 | Shen et al. | |
| 2022/0103466 A1 | 3/2022 | Cai et al. | |
| 2022/0209990 A1* | 6/2022 | Dillon | H04L 12/4633 |

OTHER PUBLICATIONS

Zhang, et al., "Power-aware Routing and Traffic Engineering: Requirements, Approaches, and Issues," Internet Engineering Task Force, Internet-Draft, https://www.ietf.org/archive/id/draft-zhang-greennet-01.txt, Jan. 10, 2013, 12 pages.

Li, et al., "The Architecture for Ubiquitous Green Community Control Network," IETF, Network Working Group, Internet-Draft, https://www.ietf.org/archive/id/draft-li-ugconet-architecture-00.txt, Nov. 19, 2015, 10 pages.

Bertini, et al., "Optimal Dynamic Configuration in Web Server Clusters," https://citeseerx.ist.psu.edu/viewdoc/download?doi=10.1.1.538.1793&rep=rep1&type=pdf, Jan. 2008, 27 pages.

\* cited by examiner

| | INTERFACE | SLA | POWER CONSUMED |
|---|---|---|---|
| PATH SELECTION | | | |
| PATH 1 (NODE A TO B) | INTERFACE 1 | HA | 3 WATTS |
| PATH 2 (NODE A TO C) | INTERFACE 3 | LOW LATENCY | 10 WATTS |
| PATH 3 (NODE C TO D) | INTERFACE 2 | HA | 6 WATTS |

| | HIGH LOAD TIME OF DAY | ABILITY TO NOTIFY LINK PARTNER |
|---|---|---|
| NETWORK DEVICE 1 | | |
| INTERFACE 1 | | YES |
|   LINE CARD 1 | AM | |
|   LINE CARD 2 | AM | YES |
| INTERFACE 2 | | |
|   MODULE 1 | PM | YES |
|   MODULE 2 | AM | NO |

TOTAL POWER CONSUMED BY NETWORK DEVICE 1: 30 WATTS
TOTAL POWER CONSUMED BY NETWORK DEVICE 2: 50 WATTS

PATH AND INTERFACE SELECTION BASED ON POWER AND INTERFACE OPERATING MODES IN A SOFTWARE DEFINED WIDE AREA NETWORK

TECHNICAL FIELD

The present disclosure relates to configuring and controlling interfaces on a network device, for power optimization, in a software-defined wide area network (SDWAN) environment.

BACKGROUND

A modern SDWAN router comprises multiple module slots that may host modules or line cards configured for predetermined interfaces. These modules or line cards can support various configurations, which are often dependent on user implementation and in many cases are based on requirements for redundancy, available bandwidth, and quality of service (QoS). Although myriad module selection provides flexibility and options for users to configure different paths as desired during heavy load and normal operations, during offload, or off-peak, hours, keeping all of these modules or line cards active is expensive in terms of power consumption. Further, many legacy modules/line cards/interfaces do not natively support power management schemes at the interface or at the system-on-chip (SoC) level.

DESCRIPTION OF EXAMPLE EMBODIMENTS

Overview

Presented herein are techniques to conserve power by network devices in a software define wide area network. A method includes monitoring operations of a software defined wide area network including a network device in the software defined wide area network, based on results of the monitoring, generating a usage model for the network device, determining, based on the usage model, an interface selection scheme for the network device, and causing the network device to execute the interface selection scheme.

In another embodiment, a device is provided. The device includes an interface configured to enable network communications, a memory, and one or more processors coupled to the interface and the memory, and configured to: monitor operations of a software defined wide area network including a network device in the software defined wide area network to obtain monitor results, based on the monitor results, generate a usage model for the network device, determine, based on the usage model, an interface selection scheme for the network device, and cause the network device to execute the interface selection scheme.

Example Embodiments

In an effort to conserve power, embodiments described herein operate in connection with network devices that comprise multiple module slots that may host modules or line cards configured for predetermined interfaces. An example of such a network device may be a router that is configured to operate in a software defined wide area network (SDWAN) environment. As will be described more fully below, the embodiments analyze, network-wide and in a holistic way, traffic profiles for the network devices and interfaces thereof, generate usage models for respective network devices and interfaces thereof based on that analysis, and then leverage the usage models to dynamically select which interfaces on the network devices are to be used and how they are to be controlled.

Figure 1:
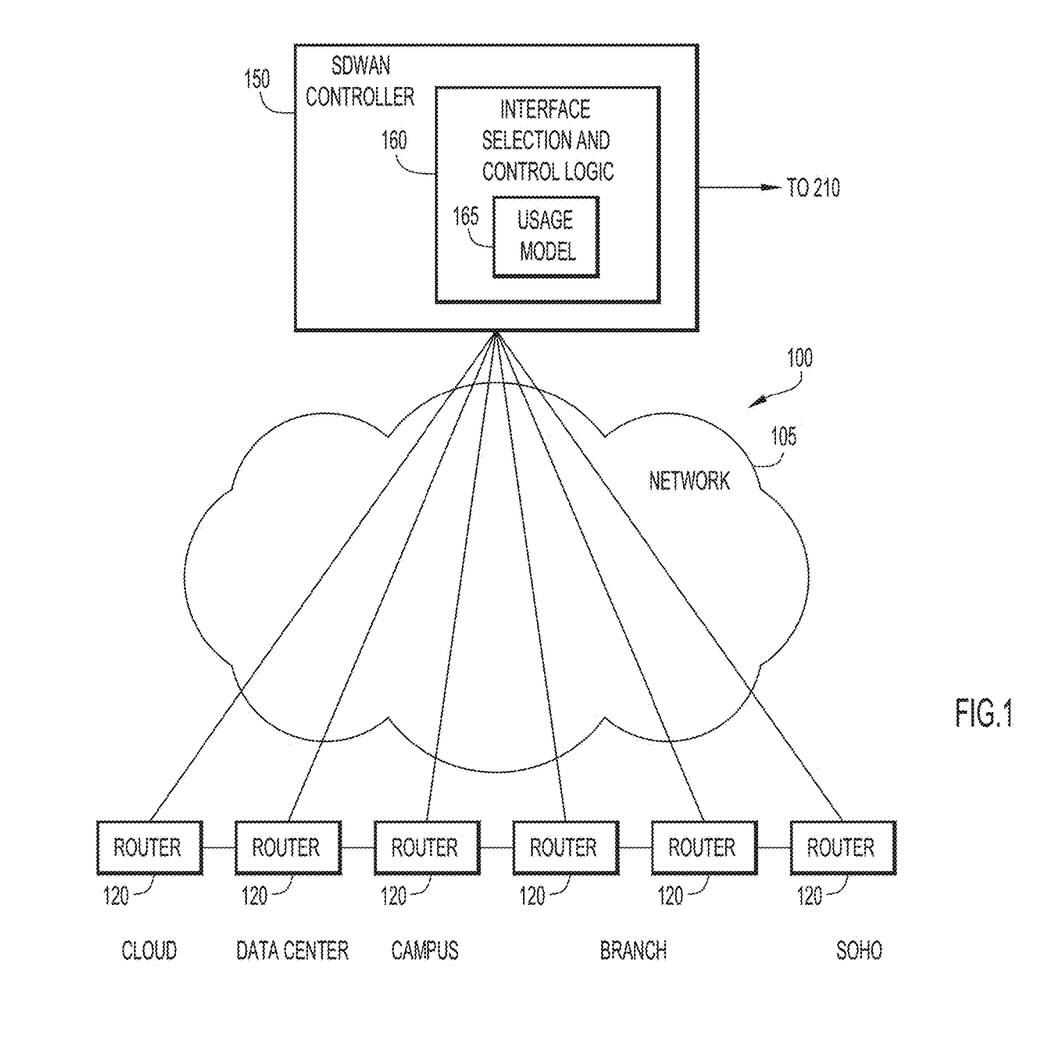
FIG. 1 shows an SDWAN including a plurality of network devices, and an SDWAN controller that hosts interface selection and control logic, according to an example embodiment.

FIG. 1 shows an SDWAN 100 including a plurality of network devices 120, and an SDWAN controller 150 that hosts interface selection and control logic 160, according to an example embodiment. Network devices 120 may be in communication with one another and with SDWAN controller 150 via a network 105, which may include a public network (e.g., the Internet) or a private network. Network devices 120 may include routers, or the like, deployed at an edge of a given network, or deployed internally to a given network. In the case of FIG. 1, network devices 120 may be deployed on behalf of, or at, a single office/home office (SOHO), a branch office, a campus, a data center, and/or cloud deployment. SDWAN controller 150 is configured to manage each of the network devices 120 to establish appropriate network connectivity and quality of service on behalf of customers or users that have computing nodes (not shown) connected to respective network devices 120. Each network device 120 may be equipped with multiple possible interfaces with which to communicate. Interface examples include T1/E1, T3/E3, DSL, 4G/5G, and/or Ethernet. Those skilled in the art will appreciate that that these and other interfaces may co-exist on any given network device 120 to enable communication via network 105 with other nodes.

Typically, a device in an SDWAN operates independently with regard to any form of power saving or power management schemes. That is, a given device may not have any hardware-related or system-on-chip (SoC) power management capabilities because these devices have no awareness of overall network traffic over, e.g., multi-hop paths or links.

In an effort to provide improved control over power consumption, and in accordance with the embodiments described herein, SDWAN controller 150, as shown in FIG. 1, also includes interface selection and control logic 160. Those skilled in the art will appreciate that interface selection and control logic 160 could be hosted elsewhere, and have connectivity to SDWAN controller 150. As will be explained in detail below, interface selection and control logic 160 is configured to analyze relevant network/traffic information from network devices 120, as well as information from, possibly, alternative sources, and is further configured to create or establish usage models for the network devices 120 and their respective interfaces, and then leverage the usage models to dynamically select and control which interfaces on the network devices are to be used and how they are to be controlled.

Figure 2:
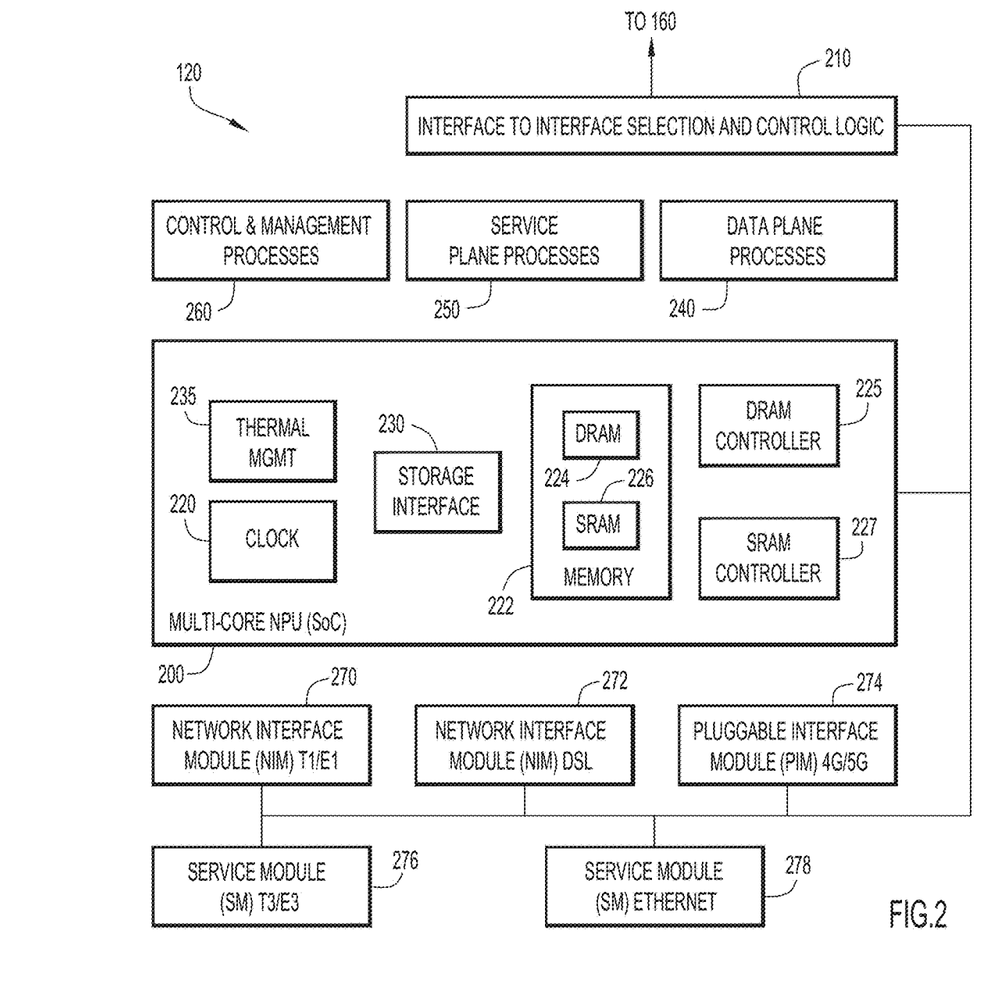
FIG. 2 is a block diagram of a given network device, including an interface to interface selection and control logic, which may be hosted by SDWAN controller, according to an example embodiment.

FIG. 2 is a block diagram of a network device 120, including an interface to interface selection and control logic 210, which may be hosted by SDWAN controller 150, according to an example embodiment. Network device 120 may be include a multi-core (network processing unit (NPU) 200, which may be implemented as a system-on-chip (SoC) and may include, for example, multiple processing cores, a clock 220, memory 222 including DRAM 224, SRAM 226, DRAM controller 225, SRAM controller 227, a storage interface 230, and a thermal management module 235. Respective processing cores (not shown) of multi-core NPU 200 may be allocated among, e.g., data plane processes 240, service plane processes 250, and control and management processes 260. Data plane processes 240 may be employed for main packet processing and forwarding functionality, including receive and transmit functionality, and cryptographic offload decryption and encryption functionality, among others. Different I/O functionalities can share the same core or have dedicated cores. Service plane processes 250 may include service plane cores, and control and management processes may include a control plane core. Service plane processes 250 may manage, among other things, container services. Control and management processes 260 may provide control functionality.

Also shown in FIG. 2 in connection with network device 120 are a plurality of interfaces including a network interface module (NIM) 270 for T1/E1 communication, a NIM 272 for DSL communication, a pluggable interface module (PIM) 274 for 4G/5G communication, a service module (SM) 276 for T3/E3 communication, and a SM 278 for Ethernet communication. Those skilled in the art will appreciate that each of the foregoing interfaces is implemented with a module or line card that is powered by network device 120.

Embodiments described herein provide an innovative approach for deciding which interfaces of network device 120 should be powered on at any given time, and how such powered on interfaces should be operated (e.g., perhaps in a lower power or low bandwidth state). These determinations are made by interface selection and control logic 160 by considering network traffic, network analytics, and licensing configurations of customers, to detect, e.g., the least used flows/sessions, and develop an appropriate usage model 165 (or models) across the network 105, and, thus, configure optimized power saving schemes for the multiple interfaces.

In an embodiment, optimized power saving schemes may be implemented by interface selection and control logic 160 based on a selected time period, network load, a combination thereof, or additional available intelligence. More specifically, interface selection and control logic 160 may be configured to consider predicted (based on a developed usage model 165) day/night traffic patterns, or user selectable patterns for sleep or reduced clocking frequency for selected interfaces. Interface selection and control logic 160 may further consider interface load using performance counters, such that when a given interface's load is below a predetermined threshold, interface selection and control logic 160 may be configured, based on the usage model 165, to command that given interface to be powered off, and/or to lower or reduce a frequency of a clock signal supplied by clock 220 to reduce overall power consumption.

Interface selection and control logic 160 may also, likewise, be configured to monitor the load of each interface, and when the load reaches a predetermined threshold level, to awaken additional modules, line cards, or interfaces, or to increase the frequency of the clock signal being supplied to such interfaces, to accommodate the traffic load (even if contrary to a given usage model). In an embodiment, interface selection and control logic 160 may also rely on a combination of time and network load to determine how to allocate, initially, the multiple interfaces operating on network device 120.

In an embodiment, interface selection and control logic 160 may rely on additional intelligence to learn traffic patterns of respective interfaces over time, and create usage model 165 that can then be leveraged to configure interface power management policies. Such additional intelligence may include user policies regarding expected network traffic for predetermined durations of time, expected maintenance periods, scaling policies, and/or memory utilization for a set time of the day/week.

Usage model 165, which is used to manage power consumption of a given interface, may also take into account a number of available interfaces (e.g., NIM 270, NIM 272, PIM 274, SM 276, and/or SM 278, the location and type of deployment, or customer profile (SOHO, branch, campus, etc.), a number of active mesh IPSEC (Internet Protocol Security) connections/tunnels active between network devices 120, application(s) being executed, and network parameters including latency, jitter, and historical information. Interface selection and control logic 160 may still further take into account, in connection with developing usage model 165, whether a given network device 120 might be down, or is scheduled to be down, which causes, or will cause, traffic to re-route, resulting in unusual network activities, or whether a scheduled event might cause an unusual spike in network activity in the future.

Once, based on usage model 165, interface selection and control logic 160 determines that traffic, or timing, or a combination thereof, suggests to implement a power saving scheme, a given network device 120 (such as a router) may be configured to copy the least active routes and/or most power consumed sessions to high performance storage such NVDIMM (non-volatile dual in-line memory module) or NVME (non-volatile memory express). Which routes and session(s) to copy may be determined by a least used active table algorithm. Also, static configurations may be pushed by SDWAN controller 150. For example, SDWAN controller 150 can send down a device configuration template that includes a power management policy template to devices with a remote procedure call (RPC). The power management policy template defines which interfaces should be powered on/off and what clock speed should be used, etc.

Interface selection and control logic 160 may also command network device 120 to disable or activate DRAM channels, via DRAM controller 225, and resource memory as appropriate in an effort to conserve power.

When usage model 165 indicates transitioning to a powered on state (from a powered down or off state) of an interface, interface selection and control logic 160 may also be configured to cause a given multi-core NPU 200 (network device 120) to reactivate resource memory and DRAM channels (via, e.g., DRAM controller 225), copy a last active session back to memory pools, bring up all or more data plane processes 240 and service plane processes 250 associated with the impacted interface, and disable any local power management functions.

In addition to controlling the power on/off states of selected interfaces, interface selection and control logic 160 may also control thermal processes via thermal management module 235. Specifically, along with commands to power off or place selected interfaces into a powered off mode, or to operate with a reduced clock speed, interface selection and control logic 160 may also command a given multi-core NPU 200 to reduce its cooling fan speed (i.e., revolution per minute (RPM)) to save still more power. For example, reducing a fan's RPM from, e.g., 60-70% (of a maximum) to 30% (of the maximum) in a reduced power mode, can save 12-15 W of power in a typical router.

Figure 3:
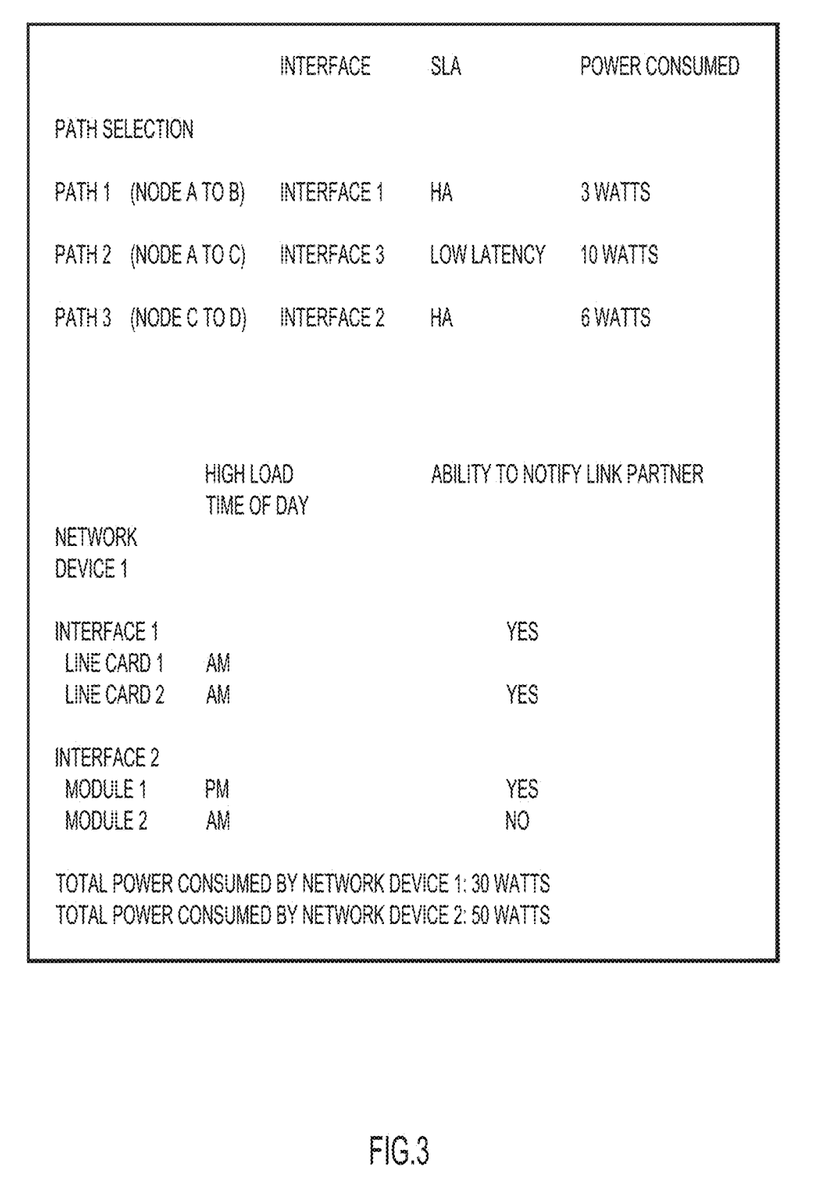
FIG. 3 shows an example database or data store of a plurality of parameters that may be collected for each module/line card or interface for a given network device in order to develop a usage model for the given network device and its several interfaces, according to an example embodiment.

Thus, and with general reference to FIG. 3, interface selection and control logic 160 is configured to dynamically measure and update a path selection database with time and day information related to network profiles during that time. That database can also be used to maintain service level agreement (SLA) requirements (e.g., high availability (HA), low latency, etc.). That is, as shown in FIG. 3, a database of various parameters can be maintained and a usage model 165 for respective interfaces (and/or for the entirety of the SDWAN) can then be derived or generated based on those parameters. In one possible implementation, different tables or databases can be arranged to represent normal interface operating modes and power management modes.

As noted, and with reference to FIG. 3, at given times, e.g., at night when interface 1, line card 1, has low traffic, that line card could be powered off. In the context of 4G/5G, for example, interface selection and control logic 160 may be configured to limit the carrier aggregation band combinations during low power modes and re-attach to the wireless network with a minimal set advertised to a base station (B S), adjust transmit power, re-configure speeds of the interfaces, and/or reconfigure serializer/deserializer (SERDES) configuration on a backplane to match the interface speed at lower speeds.

As shown in FIG. 3, the database may maintain the total power for various paths (path 1, path 2, path 3, etc.) and operating modes of the interfaces, and that information can be shared across the fabric (i.e., network 105) as desired and/or to interface selection and control logic 160 in SDWAN controller 150. In some implementations, a given interface can notify its link partner via, e.g., Operations, Administration, and Maintenance (OAM) frames, regarding power management transitions, and perhaps a request or notification to change from a first interface to a second interface for a given communications flow.

With the information collected by interface selection and control logic 160 and the generated usage models, interface selection and control logic 160 is configured to determine a least power path. This information is then pushed to respective network devices 120 so that the respective interfaces operating thereon will be configured into predetermined power management states. Interface selection and control logic 160 may also be configured to send appropriate "dying gasp" messages to link partners via, e.g., SMS on LTE/5G.

In an embodiment, interface selection and control logic 160 may use artificial intelligence and/or machine learning to optimize for overall system power consumption and/or individual path power consumption, to optimize for overall system throughput performance and individual flow throughput performance, to adjust and enable/disable or configure interfaces/modules, and to dynamically learn the traffic profile and user configuration/setup and or behavior.

Respective network devices 120 may be configured to include an intelligent microcontroller unit (MCU) with a hardware engine that monitors the power consumption of respective interfaces and line cards. Software or firmware agents may be deployed on individual network devices 120 that detect traffic profiles and inform interface selection and control logic 160 about those traffic profiles. Interface selection and control logic 160 may rely on hardware and/or software engines that run one or more predictive models to determine path selection based on historical information about flow characteristics, system behavior, and operating environments. Examples of information upon which such predictive models may rely include flows occurring on specific days of the week, and or time of day, flows contributing to specific types of resource consumption, and/or current operating conditions and their impact on performance.

Depending on an expected reduced power profile, given the powered state of respective interfaces, thermal management may also be engaged to, e.g., reduce fan speed, and thus save even more power.

Thus, interface selection and control logic 160 may be configured to provide a mechanism to dynamically assign or select different interfaces (e.g., Ethernet, 4G/5G, etc.) between and among various nodes (i.e., node A, node B, node C, node D) (i.e., network devices 120) based on power savings during predetermined periods of a day, or time slots, and/or based on system load to achieve power savings. These mechanisms include powering on or off selected interfaces, or line cards or modules thereof, during that time, after, e.g., saving network information (routing tables, etc.) to appropriate storage, and coordinating with, or notifying, link partners that an interface for a given flow is about to change.

Interface selection and control logic 160 may also maintain a database, in connection with developing and updating a usage model 165, of power versus scale and performance that is updated over time or using static configurations. In this way, the usage model 165 can be updated and refined over time.

Figure 4:
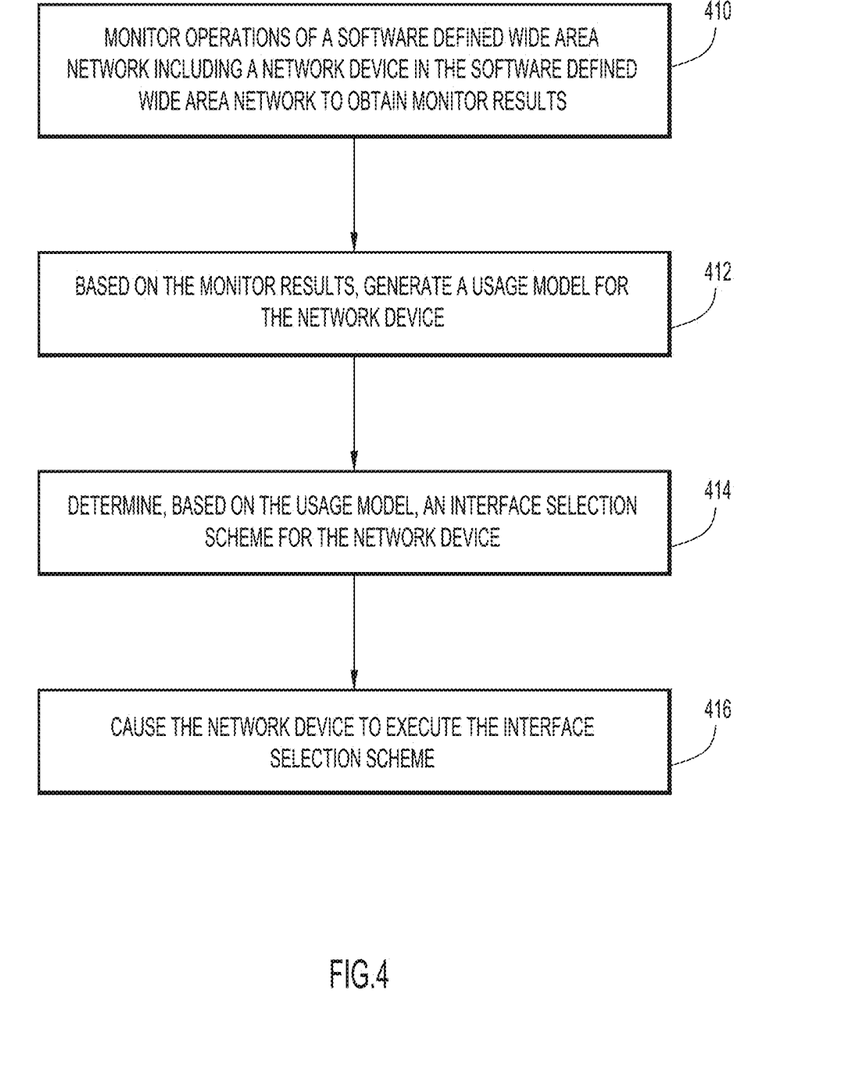
FIG. 4 shows a series of operations that may be executed by interface selection and control logic, according to an example embodiment.

FIG. 4 shows a series of operations that may be executed by interface selection and control logic 160, according to an example embodiment. At 410, an operation is configured to monitor operations of a software defined wide area network including a network device in the software defined wide area network to obtain monitor results. At 412, an operation is configured to, based on the monitor results, generate a usage model for the network device. At 414, an operation is configured to determine, based on the usage model, an interface selection scheme for the network device. And, at 416, an operation is configured to cause the network device to execute the interface selection scheme.

Figure 5:
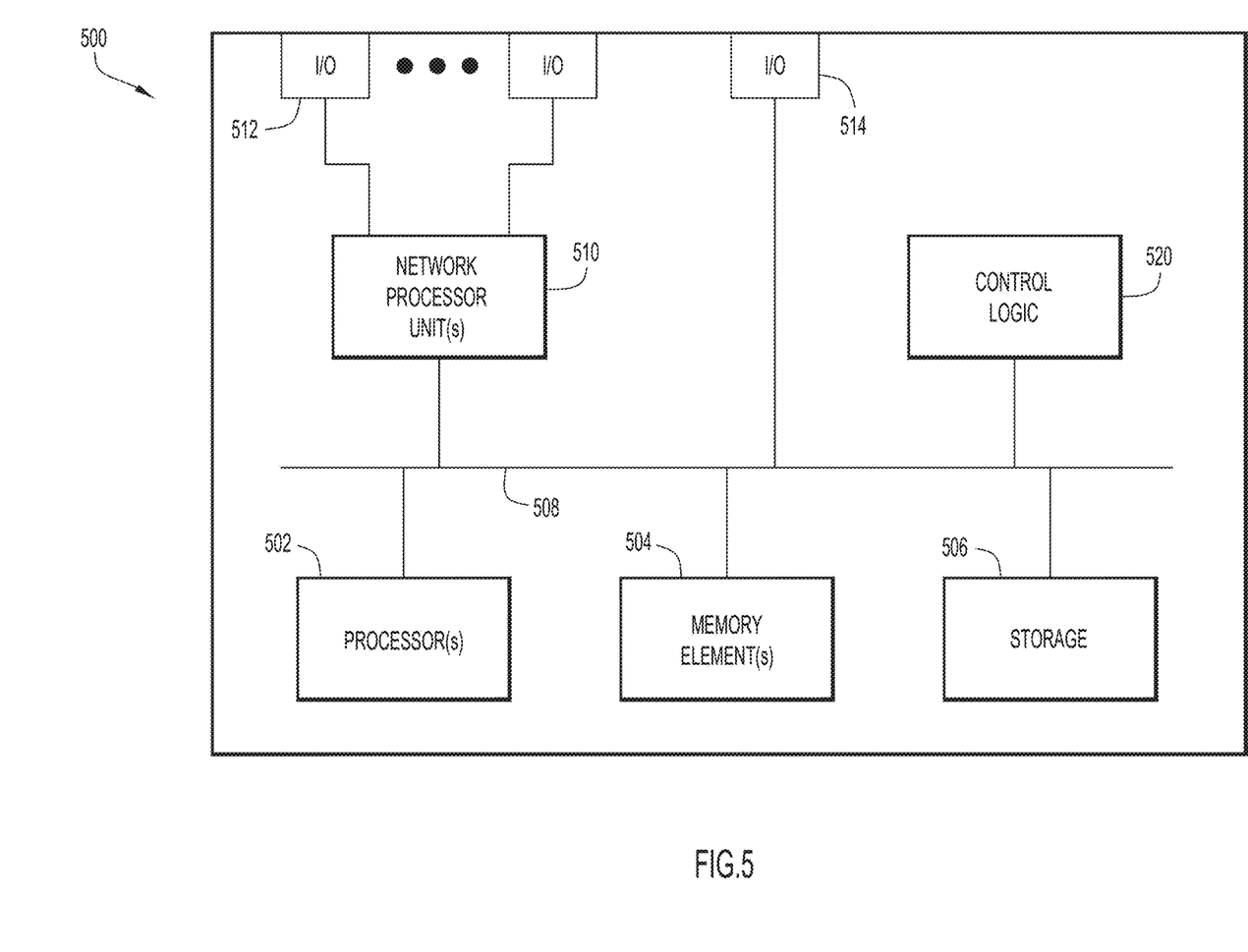
FIG. 5 is a block diagram of a device that may be configured as, e.g., an SDWAN controller that may host interface selection and control logic, and perform the techniques described herein, according to an example embodiment.

FIG. 5 illustrates a hardware block diagram of a computing device 500 that may perform functions associated with operations discussed herein in connection with the techniques depicted in FIGS. 1-4. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520 (which could include, for example, interface selection and control logic 160). In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In sum, in one embodiment a method is provided. The method may include monitoring operations of a software defined wide area network including a network device in the software defined wide area network to obtain monitor results, based on monitor results, generating a usage model for the network device, determining, based on the usage model, an interface selection scheme for the network device, and causing the network device to execute the interface selection scheme.

In the method, the interface selection scheme may include at least one of reducing a bandwidth of a selected interface and powering off the selected interface.

In the method, the interface selection scheme may include controlling a transmit power of a selected interface.

In the method, the interface selection scheme may include limiting carrier aggregation band combinations.

In the method, the usage model and interface selection scheme may be based on time of day and/or loads of respective interfaces of the network device.

In the method, the usage model and interface selection scheme may be based on a multi-hop network path of communication flows.

The method may further include notifying a partner network device to change a communication link from a first interface that is to be powered off in accordance with the interface selection scheme to a second interface that is powered on.

The method may further include causing the network device to execute the interface selection scheme by powering on or off at least one of a T1/E1, T3/E3, DSL, 4G/5G, or Ethernet interface.

In the method, monitoring operations of the software defined wide area network may include monitoring for future scheduled events.

The method may be performed by a software defined wide area network controller.

A device may also be provided. The device may include an interface configured to enable network communications, a memory, and one or more processors coupled to the interface and the memory, and configured to: monitor operations of a software defined wide area network including a network device in the software defined wide area network to obtain monitor results, based on the monitor results, generate a usage model for the network device, determine, based on the usage model, an interface selection scheme for the network device, and cause the network device to execute the interface selection scheme.

In the device, the interface selection scheme may include at least one of reducing a bandwidth of a selected interface and powering off the selected interface.

In the device, the interface selection scheme may include controlling a transmit power of a selected interface.

In the device, the interface selection scheme may include limiting carrier aggregation band combinations dynamically based on traffic profile and bandwidth.

In the device, the usage model and interface selection scheme may be based on time of day and/or loads of respective interfaces of the network device.

In the device, the usage model and interface selection scheme may be based on a multi-hop network path of communication flows.

In the device, the one or more processors may be further configured to notify a partner network device to change a communication link from a first interface that is to be powered off in accordance with the interface selection scheme to a second interface that is powered on.

In yet another embodiment, one or more non-transitory computer readable storage media encoded with instructions are provided that, when executed by a processor, cause the processor to: monitor operations of a software defined wide area network including a network device in the software defined wide area network to obtain monitor results, based on the monitor results, generate a usage model for the network device, determine, based on the usage model, an interface selection scheme for the network device, and cause the network device to execute the interface selection scheme.

In an embodiment, the interface selection scheme includes at least one of reducing a bandwidth of a selected interface and powering off the selected interface.

In an embodiment, the interface selection scheme includes controlling a transmit power of a selected interface.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
monitoring operations of a software defined wide area network including network communication interfaces of a network device in the software defined wide area network to obtain monitor results;
based on the monitor results, generating a network communication interface usage model for the network device;
determining, based on the network communication interface usage model, an interface selection scheme for the network device; and
causing the network device to execute the interface selection scheme.

2. The method of claim 1, wherein the interface selection scheme comprises at least one of reducing a bandwidth of a selected interface and powering off the selected interface.

3. The method of claim 1, wherein the interface selection scheme comprises controlling a transmit power of a selected interface.

4. The method of claim 1, wherein the interface selection scheme comprises limiting carrier aggregation band combinations.

5. The method of claim 1, wherein the network communication interface usage model and interface selection scheme are based on time of day and/or loads of respective network communication interfaces of the network device.

6. The method of claim 1, wherein the network communication interface usage model and interface selection scheme are based on a multi-hop network path of communication flows.

7. The method of claim 1, further comprising notifying a partner network device to change a communication link from a first interface that is to be powered off in accordance with the interface selection scheme to a second interface that is powered on.

8. The method of claim 1, further comprising causing the network device to execute the interface selection scheme by powering on or off at least one of a T1/E1, T3/E3, DSL, 4G/5G, or Ethernet interface.

9. The method of claim 1, further comprising determining the interface selection scheme based on future scheduled events.

10. The method of claim 1, wherein the method is performed by a software defined wide area network controller.

11. A device comprising:
an interface configured to enable network communications;
a memory; and
one or more processors coupled to the interface and the memory, and configured to:
monitor operations of a software defined wide area network including network communication interfaces of a network device in the software defined wide area network to obtain monitor results;
based on the monitor results, generate a network communication interface usage model for the network device;
determine, based on the network communication interface usage model, an interface selection scheme for the network device; and
cause the network device to execute the interface selection scheme.

12. The device of claim 11, wherein the interface selection scheme comprises at least one of reducing a bandwidth of a selected interface and powering off the selected interface.

13. The device of claim 11, wherein the interface selection scheme comprises controlling a transmit power of a selected interface.

14. The device of claim 11, wherein the interface selection scheme comprises limiting carrier aggregation band combinations dynamically based on traffic profile and bandwidth.

15. The device of claim 11, wherein the network communication interface usage model and interface selection scheme are based on time of day and/or loads of respective interfaces of the network device.

16. The device of claim 11, wherein the network communication interface usage model and interface selection scheme are based on a multi-hop network path of communication flows.

17. The device of claim 11, wherein the one or more processors are further configured to notify a partner network device to change a communication link from a first interface that is to be powered off in accordance with the interface selection scheme to a second interface that is powered on.

18. One or more non-transitory computer readable storage media encoded with instructions that, when executed by a processor, cause the processor to:
monitor operations of a software defined wide area network including network communication interfaces of a network device in the software defined wide area network to obtain monitor results;
based on the monitor results, generate a network communication interface usage model for the network device;
determine, based on the network communication interface usage model, an interface selection scheme for the network device; and
cause the network device to execute the interface selection scheme.

19. The one or more non-transitory computer readable storage media of claim 18, wherein the interface selection scheme comprises at least one of reducing a bandwidth of a selected interface and powering off the selected interface.

20. The one or more non-transitory computer readable storage media of claim 18, wherein the interface selection scheme comprises controlling a transmit power of a selected interface.

* * * * *